United States Patent
Hayakawa et al.

(10) Patent No.: US 11,325,511 B2
(45) Date of Patent: May 10, 2022

(54) SEAT HEATER

(71) Applicant: Panasonic Intellectual Property Management Co., Ltd., Osaka (JP)

(72) Inventors: Tomohisa Hayakawa, Shiga (JP); Takaaki Hyoudou, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 507 days.

(21) Appl. No.: 16/481,357

(22) PCT Filed: Jan. 26, 2018

(86) PCT No.: PCT/JP2018/002388
§ 371 (c)(1),
(2) Date: Jul. 26, 2019

(87) PCT Pub. No.: WO2018/143062
PCT Pub. Date: Aug. 9, 2018

(65) Prior Publication Data
US 2019/0389346 A1 Dec. 26, 2019

(30) Foreign Application Priority Data
Feb. 1, 2017 (JP) .............................. JP2017-016514

(51) Int. Cl.
*B60N 2/56* (2006.01)
*H05B 3/20* (2006.01)

(52) U.S. Cl.
CPC .......... *B60N 2/5685* (2013.01); *B60N 2/5657* (2013.01); *H05B 3/20* (2013.01); *H05B 2203/003* (2013.01); *H05B 2203/029* (2013.01)

(58) Field of Classification Search
CPC ...... B60N 2/5657; B60N 2/5685; H05B 3/20; H05B 2203/029; H05B 2203/003
(Continued)

(56) References Cited

U.S. PATENT DOCUMENTS 4,044,221 A * 8/1977 Kuhn ..................... H05B 3/342
219/217
2003/0213797 A1 11/2003 Yoneyama et al.
(Continued)

FOREIGN PATENT DOCUMENTS

CN 201384300 Y * 1/2010
JP 2003-297532 10/2003
(Continued)

OTHER PUBLICATIONS

International Search Report of PCT application No. PCT/JP2018/002388 dated May 1, 2018.

*Primary Examiner* — Milton Nelson, Jr.
(74) *Attorney, Agent, or Firm* — Greenblum & Bernstein, P.L.C.

(57) ABSTRACT

A seat heater mounted to a seat includes: a heating wire; a base material provided with the heating wire and having air permeability; an excessive temperature rise prevention element that prevents an excessive temperature rise of the heating wire; and an auxiliary heating wire that heats the excessive temperature rise prevention element, in which air permeability in an auxiliary heater area provided with the auxiliary heating wire is lower than air permeability in a heater area provided with the heating wire, so that heat dissipation in the auxiliary heater area is suppressed to enable a temperature of the excessive temperature rise prevention element to rise efficiently to follow the temperature rise of the heater area.

6 Claims, 4 Drawing Sheets

(58) Field of Classification Search
USPC .................................................. 297/180.12
See application file for complete search history.

(56) References Cited

U.S. PATENT DOCUMENTS

| | | |
|---|---|---|
| 2007/0246456 A1 | 10/2007 | Yoneyama et al. |
| 2012/0049586 A1 | 3/2012 | Yoshimoto et al. |
| 2012/0073037 A1* | 3/2012 | Kim .................... H05B 1/0227 |
| | | 219/217 |

FOREIGN PATENT DOCUMENTS

| | | |
|---|---|---|
| WO | 2010/137290 | 12/2010 |
| WO | 2012/049827 | 4/2012 |

* cited by examiner

SEAT HEATER

CROSS-REFERENCE TO RELATED APPLICATIONS

This application is a U.S. national stage application of the PCT International Application No. PCT/JP2018/002388 filed on Jan. 26, 2018, which claims the benefit of foreign priority of Japanese patent application No. 2017-016514 filed on Feb. 1, 2017, the contents all of which are incorporated herein by reference.

TECHNICAL FIELD

The present disclosure relates to a seat heater mounted to a seat, and mainly relates to a seat heater mounted to a seat for a vehicle.

BACKGROUND ART

As a conventional method for warming a seat mainly used in vehicles, a technique of warming the seat with a seat heater mounted in the seat has generally been employed. Recently, there has been a demand for cooling the seat itself as part of an effort to offer an even more comfortable environment in vehicle cabins, and Peltier devices have been used as a solution for achieving both cooling and heating. Such a technique achieves the heating with warm air blown through a seat surface, which results in the warm air being felt less warm than the actual temperature and thus has been incapable of achieving a sufficient heating effect. In view of this, the use of the conventional seat heater together with a cooling system including the Peltier devices or an air blowing fan can be considered, but this requires an essential condition to be satisfied, which is an improvement in air permeability of the seat heater.

To achieve such air permeability, a seat heater with a heating wire fixed to a base material having a mesh structure has been developed (see, PTL 1, for example).

CITATION LIST

Patent Literature

PTL 1: Unexamined Japanese Patent Publication No. 2003-297532

SUMMARY OF THE INVENTION

The present disclosure provides a seat heater that can achieve a higher level of comfortability while ensuring air permeability.

A seat heater according to the present disclosure is a seat heater mounted to a seat, and the seat heater includes: a heating wire; a base material; an excessive temperature rise prevention element; and an auxiliary heating wire. The base material is provided with the heating wire and has air permeability, the excessive temperature rise prevention element prevents an excessive temperature rise of the heating wire, and the auxiliary heating wire heats the excessive temperature rise prevention element, the base material is further provided with an auxiliary heater area, and the auxiliary heater area includes a cooling suppression part for the excessive temperature rise prevention element.

The seat heater according to the present invention can achieve a higher level of comfortability while ensuring air permeability.

DESCRIPTION OF EMBODIMENT

Figure 1:
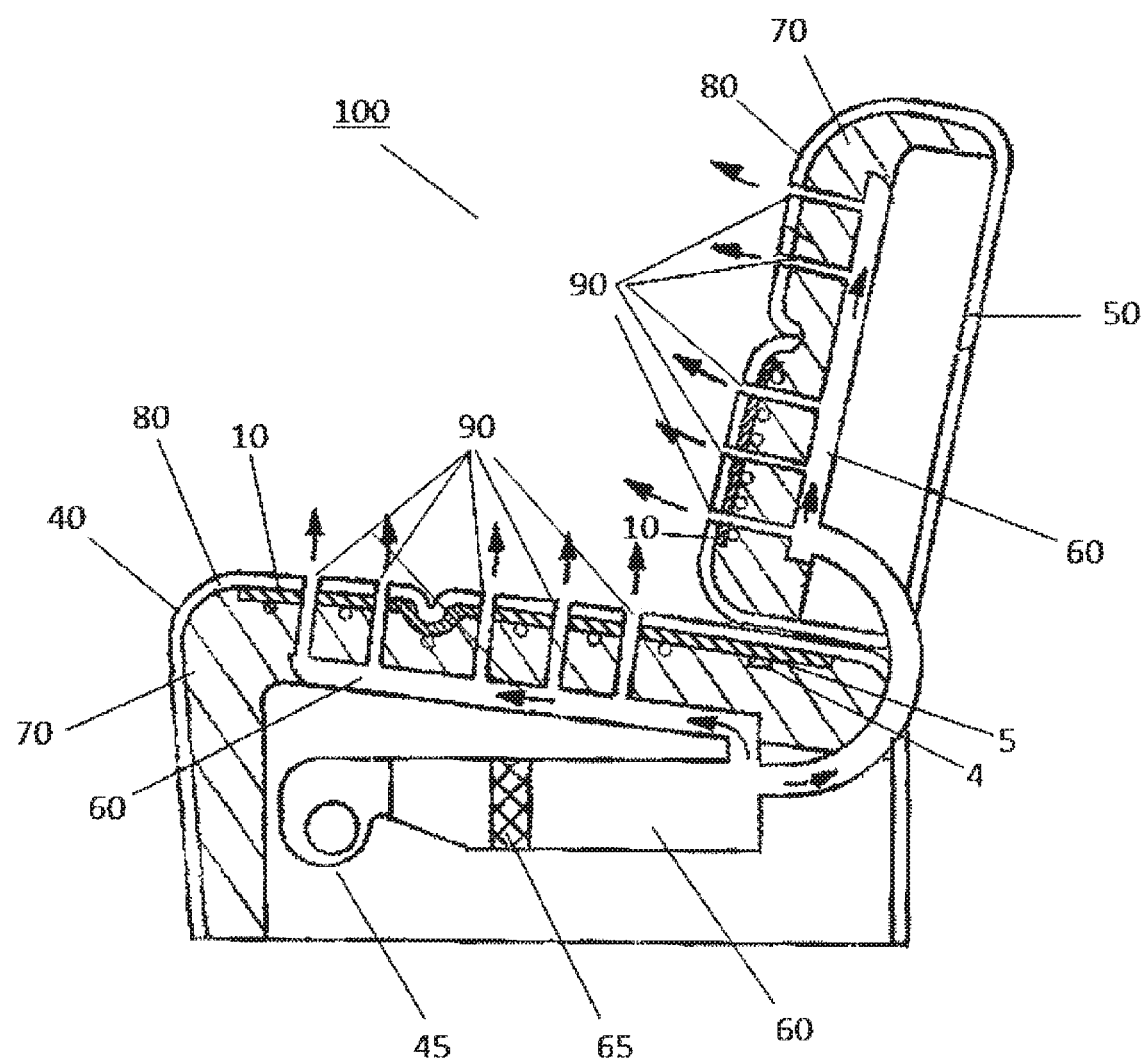
FIG. 1 is a cross-sectional view of a seat provided with a seat heater according to an exemplary embodiment of the present disclosure.

Prior to describing an exemplary embodiment according to the present disclosure, a problem found in a conventional configuration will briefly be described.

Recently, hybrid and electrically driven vehicles have become popular. These types of vehicles involve a smaller amount of heat emitted from the engine compared with other types of vehicles, which means that the heat emitted from the engine alone may not sufficiently warm an interior of a cabin. Thus, a seat heater that directly warms a seated person has been attracting attention. The seat heater used for such types of automobiles has been required to have an even higher performance and a higher heating performance (higher output) in particular, to be usable for the warming in vehicles with engines emitting a smaller amount of heat.

Although not disclosed in PTL 1, a seat heater further includes an excessive temperature rise prevention element such as a thermostat disposed as a function for preventing excessive temperature rise of the heating wire, and an auxiliary heating wire for heating such an excessive temperature rise prevention element. When such a temperature detection element and the auxiliary heating wire are provided on a base material with high air permeability that is also provided with the heating wire, the following problem occurs.

The seat heater with a higher output involves a quicker temperature rise of the heating wire, compared with conventional seat heaters. The auxiliary heating wire also needs to have a higher output so as to heat the temperature detection element to follow the temperature rise of the heating wire. However, a new problem has been found that, with a base material with a mesh structure or the like having high air permeability, a higher output of the auxiliary heating wire does not result in efficient heating of the excessive temperature rise prevention element.

A configuration of a seat heater solving such a problem will be described below with reference to the accompanying drawings. Note that the present disclosure is not limited to the exemplary embodiment described above. In the description below, identical or corresponding elements depicted in all of the drawings are denoted by identical reference marks, and a duplicate description of these elements is omitted.

A seat heater according to a first aspect of the present disclosure is a seat heater mounted to a seat, the seat heater including: a heating wire; a base material provided with the heating wire and having air permeability; an excessive temperature rise prevention element that prevents an excessive temperature rise of the heating wire; and an auxiliary heating wire that heats the excessive temperature rise prevention element. An auxiliary heater area provided with the auxiliary heating wire is provided with a cooling suppression part for the excessive temperature rise prevention element. The cooling suppression part is formed to have air permeability in the auxiliary heater area lower than air permeability in a heater area provided with the heating wire.

Since the air permeability in the auxiliary heater area is lower than the air permeability in the heater area, the heat dissipation in the auxiliary heater area is suppressed to enable the temperature of the excessive temperature rise prevention element to rise efficiently to follow the temperature rise of the heater area. This configuration facilitates passage of air from the inside of the seat to the seated person, while enabling the seat heater to have a higher output, and thus is capable of swiftly warming the seated person seated on the seat in cold season to offer a higher level of comfortability.

According to a seat heater of a second aspect of the present disclosure, in the seat heater according to the first aspect, the cooling suppression part is formed by providing an air vent hole to the base material in the heater area and not providing an air vent hole to the base material in the auxiliary heater area. This configuration enables the heater area to have higher air permeability and the auxiliary heater area to have lower air permeability.

According to a seat heater of a third aspect of the present disclosure, in the seat heater according to the first aspect, the cooling suppression part is formed by designing the base material to have a mesh structure with the auxiliary heater area having meshes smaller than meshes in the heater area. This configuration enables the heater area to have higher air permeability and the auxiliary heater area to have lower air permeability.

According to a seat heater of a fourth aspect of the present disclosure, in any one of the seat heater according to the first to third aspects, the cooling suppression part is formed by providing the base material in the auxiliary heater area with a sheet having air permeability lower than the air permeability of the base material. This configuration enables the heater area to have higher air permeability and the auxiliary heater area to have lower air permeability.

According to a seat heater of a fifth aspect of the present disclosure, in any one of the seat heater according to the first to fourth aspects, the cooling suppression part is formed by covering the excessive temperature rise prevention element and the auxiliary heater area with a covering material having air permeability lower than the air permeability of the base material. This configuration enables heat dissipation in the auxiliary heater area to be suppressed, so that the temperature of the excessive temperature rise prevention element can be raised efficiently.

EXEMPLARY EMBODIMENT

FIG. 1 is a cross-sectional view of a seat provided with a seat heater according to the present exemplary embodiment. Seat 100 installed in a cabin of a vehicle includes seat part 40 on which a seated person is seated and backrest 50 that supports a back of the seated person. Seat part 40 incorporates blower 45. Air from blower 45 passes through air duct 60 installed in seat part 40 and in backrest 50 to be introduced to pad 70 made of cushioning material such as urethane foaming resin. The air introduced to pad 70 passes through seat heater 10 to be emitted through ejection holes 90 provided in cover 80.

With the configuration described above, the air is blown onto the back to buttocks and onto legs of the seated person seated on seat 100. In this manner, air is emitted in an area in contact with a human body surface. As a result, even in a state where the temperature of cover 80 has risen due to insulation in summer, the seated person can be seated comfortably with sweat dried by vaporization, the heat of which is taken away from the skin surface accordingly.

Seat 100 according to the present exemplary embodiment has seat heater 10 disposed between pad 70 and cover 80. During a heating operation in winter, seat heater 10 is energized to generate heat, and the heat is transmitted to cover 80 so that cover 80 can be warmed. When cover 80 is warmed, the seated person can also be warmed through conduction and radiation. This configuration can achieve a higher temperature of cover 80 than in a case of heating using warm air. Furthermore, the temperature rises at a higher rate, which achieves a higher level of comfortability.

Peltier device 65 is provided at an intermediate portion of air duct 60, so that the air from blower 45 can be cooled to send cool air in response to a temperature rise in summer, which achieves an even higher level of comfortability. Furthermore, in winter, once a steady state is achieved as a result of quickly warning up the seated person with seat heater 10 energized, switching can be made to warm air heating in which air from blower 45 is heated by Peltier device 65 to be emitted as warm air from ejection holes 90.

Figure 2:
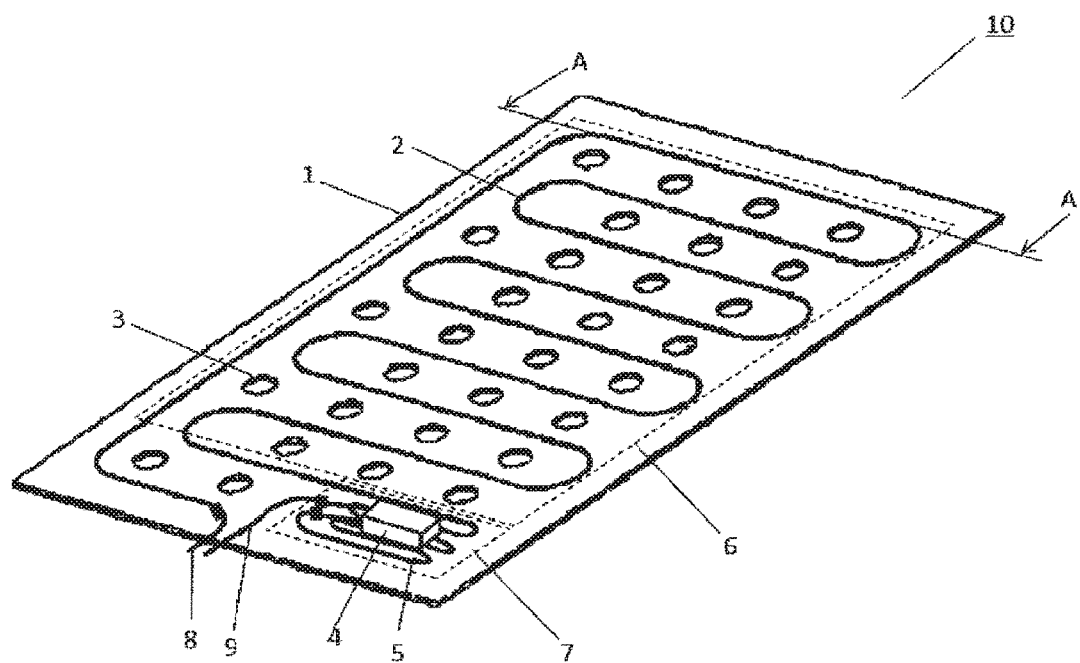
FIG. 2 is a perspective view of the seat heater according to the exemplary embodiment of the present disclosure.

FIG. 2 is a perspective view of the seat heater according to the present exemplary embodiment having a heating wire fixed to a base material having air permeability. This base material 1 having air permeability in FIG. 2 has through holes 3. Heating wire 2 is connected in series with thermostat 4 for preventing an excessive temperature rise. Heating wire 2 is fixed to base material 1 by sewing based on an appropriate wiring pattern. According to the wiring pattern, heating wire 2, connected to lead wire 8, meanders in heater area 6 for warming a seated person seated on the seat and also forms auxiliary heating wire 5 that heats thermostat 4. Thus, heating wire 2 and auxiliary heating wire 5 are formed by a single electrically heating wire in this configuration. Note that heating wire 2 and auxiliary heating wire 5 may be formed by separate electrically heating wires connected to each other through a lead wire. An area where auxiliary heating wire 5 is arranged is referred to as auxiliary heater area 7 to be distinguished from heater area 6. Thermostat 4 has one end connected to auxiliary heating wire 5 and has another end connected to lead wire 9. Heating wire 2 and auxiliary heating wire 5 are heated by power supplied thereto with lead wires 8, 9 connected to a power source (not illustrated).

Base material 1 has through holes 3 formed in heater area 6 but not formed in auxiliary heater area 7 provided with thermostat 4. In this manner, a cooling suppression part for thermostat 4 is formed. Specifically, the cooling suppression part corresponds to auxiliary heater area 7, which is an area of base material 1 not provided with through holes 3. With this configuration, thermostat 4 can be efficiently heated with heat dissipation suppressed, even when auxiliary heater area 7 is relatively small. Thus, even when the seat heater has a higher output, thermostat 4 can have a temperature rise following the temperature rise of heater area 6.

In the present exemplary embodiment, through holes 3 are formed between rows of heating wire 2. Thus, through holes 3 can be provided on base material 1 by pressing or the like, after heating wire 2 has been placed. Alternatively, through holes 3 each having a diameter less than or equal to a sewing pitch of heating wire 2 may be provided on base material 1 first, and then heating wire 2 may be placed, although not illustrated. With this configuration, the uniform air permeability can be ensured entirely over heater area 6 provided with through holes 3, and the sewing can be free of sewing failures to ensure the fixing of heating wire 2 on base material 1.

Figure 3:
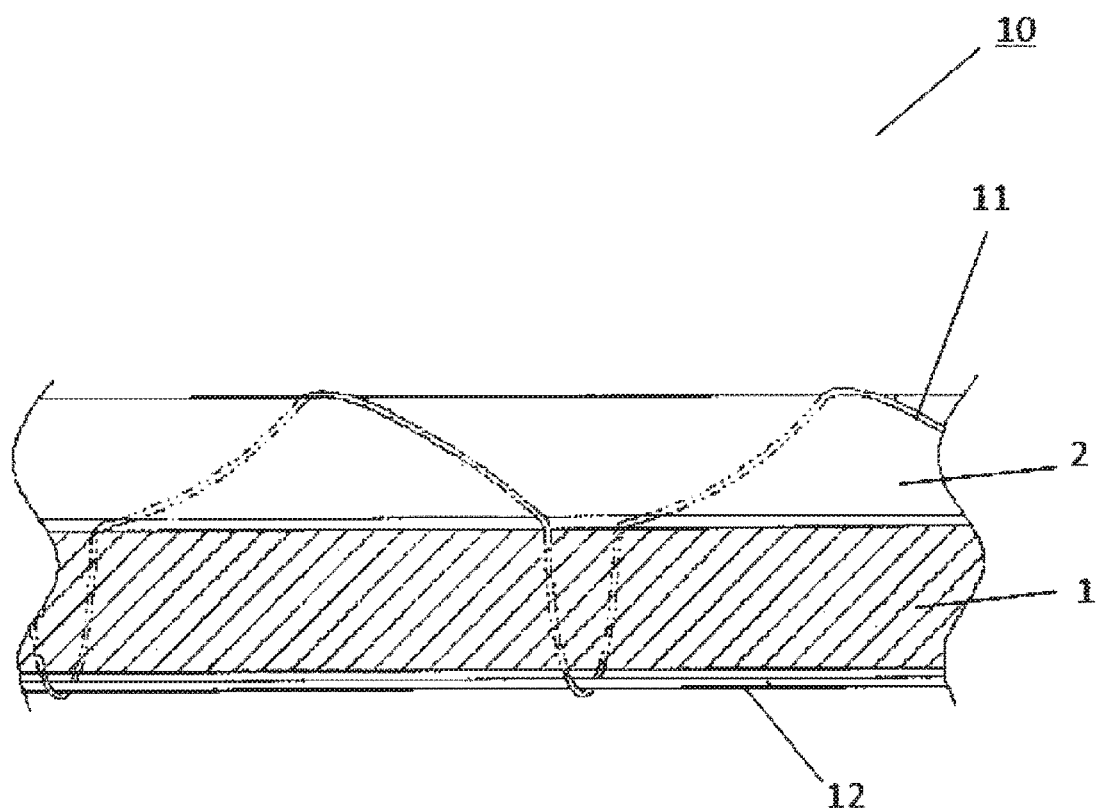
FIG. 3 is a cross-sectional view taken along line A-A in FIG. 2.

FIG. 3 is a cross-sectional view taken along line A-A in FIG. 2, illustrating an example where heating wire 2 is fixed by sewing. In FIG. 3, heating wire 2 is fixed to base material 1 with an upper thread 11 and a lower thread 12. Note that the present invention is not limited to the present exemplary embodiment where the upper thread 11 and the lower thread 12 are used for fixing heating wire 2 to base material 1 by sewing. For example, depending on how the sewing is performed, the lower thread 12 may be omitted, and heating wire 2 may be used instead for fixing heating wire 2 on base material 1. Furthermore, heating wire 2 may be fixed on base material 1 by means of an adhesive.

First Modification

Figure 4:
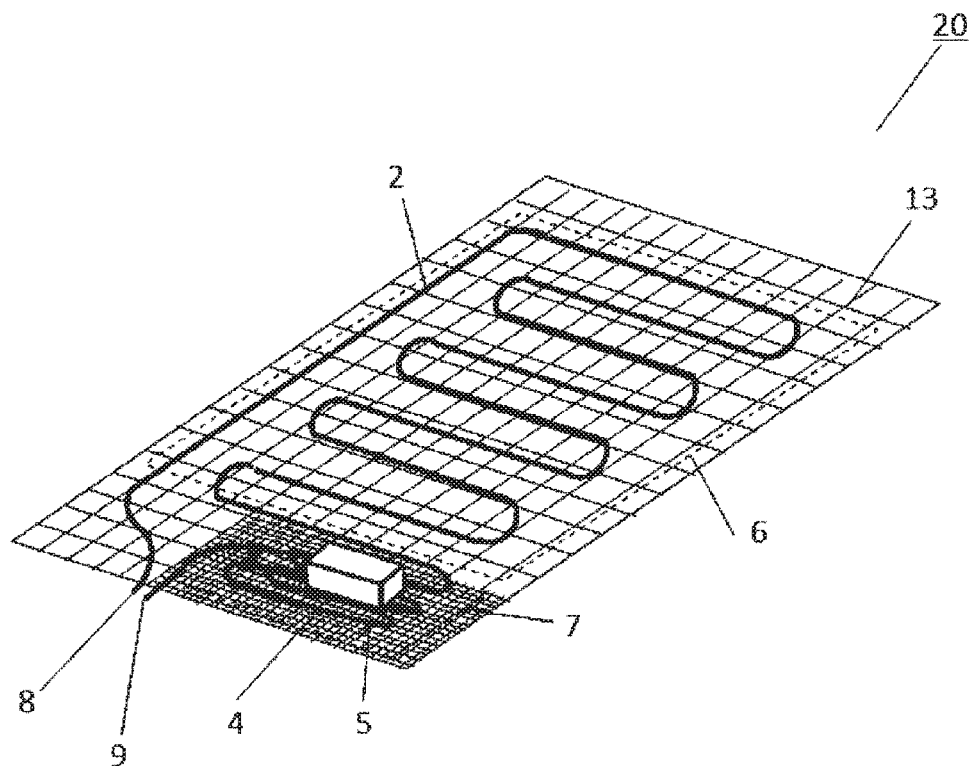
FIG. 4 is a perspective view of a seat heater according to a first modification of the exemplary embodiment of the present disclosure.

FIG. 4 is a perspective view of a seat heater 20 having heating wire 2 fixed on a base material 13 having a mesh structure. Here, meshes are illustrated to be larger than they really are so that one can more easily recognize that base material 13 has the mesh structure. As in FIG. 2, heating wire 2 is fixed on base material 13 by sewing based on an appropriate wiring pattern. Base material 13 with the mesh structure can easily have better air permeability than base material 1 such as nonwoven fabric provided with through holes.

Base material 13 has smaller meshes in auxiliary heater area 7 provided with thermostat 4, than in heater area 6 for warming the seated person seated on the seat. In this manner, the cooling suppression part for thermostat 4 is formed. Specifically, the cooling suppression part corresponds to auxiliary heater area 7 that is a portion of base material 13 with smaller meshes. Air from the inside of the seat can easily pass through heater area 6 having excellent air permeability. Heat dissipation is suppressed in auxiliary heater area 7 with lower air permeability than in heater area 6, so that thermostat 4 can be efficiently heated even when auxiliary heater area 7 is relatively small. Thus, thermostat 4 can have a temperature rise following the temperature rise of heater area 6, even when the seat heater is designed to have a higher output.

Figure 5:
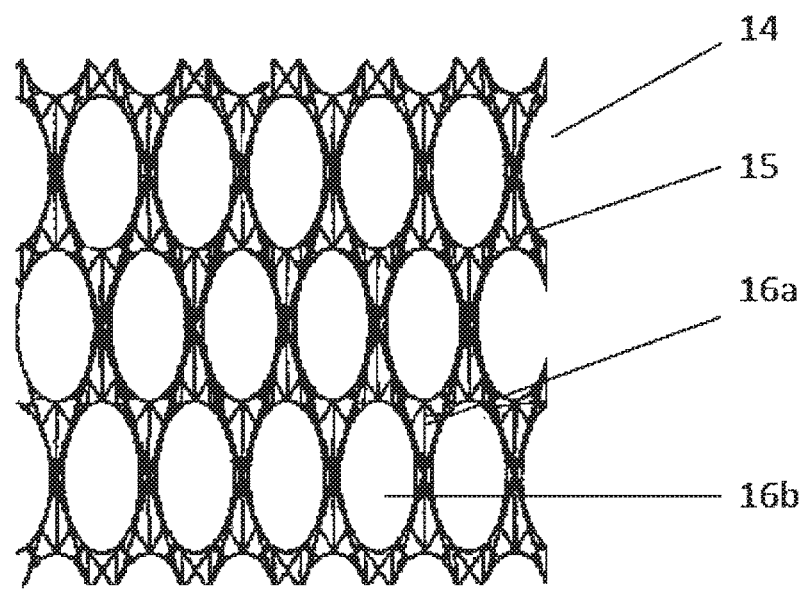
FIG. 5 is a diagram illustrating a configuration of another base material of the seat heater according to the first modification of the exemplary embodiment of the present disclosure.

FIG. 5 is a diagram illustrating an example of a base material with a mesh structure obtained by braiding threads. Base material 14 includes small openings 16a where threads 15 are densely braided, and large openings 16b formed between small openings 16a. Base material 14 formed as a combination of small openings 16a and large openings 16b as illustrated in FIG. 5 can have a higher mechanical strength, while ensuring sufficient air permeability in heater area 6. Specifically, when only two threads form an intersection of meshes, stress on the base material may generally be concentrate on the intersection of the meshes, resulting in breakage of the meshes at the intersection. With small openings 16a in a form of a web formed by a plurality of threads provided between large openings 16b as in this exemplary embodiment, the stress imposed on the intersections due to the seating load can be distributed so that base material 14 can have a higher durability. Note that a shape of the mesh opening is not limited to that illustrated in FIG. 5.

In FIG. 4, the heat dissipation is suppressed with base material 13 designed to have meshes in auxiliary heater area 7 smaller than meshes in heater area 6, but the present disclosure is not limited to this configuration. Alternatively, base material 13 may have the same mesh size in auxiliary heater area 7 and in heater area 6, and the heat dissipation may be suppressed with the cooling suppression part formed by providing, to auxiliary heater area 7, a sheet of nonwoven fabric, cloth, and the like with air permeability lower than that of base material 13. Base material 13 may have a lower surface provided with the sheet of nonwoven fabric, cloth, and the like and have an upper surface provided with auxiliary heating wire 5, or may have the upper surface provided with the sheet of nonwoven fabric, cloth, and the like with auxiliary heating wire 5 provided on the sheet. With this configuration, heating wire 2 can surely be fixed on base material 13 by sewing, even when auxiliary heating wire 5 is more densely arranged than the wiring pattern of heating wire 2 in heater area 6. The configuration of providing the sheet of nonwoven fabric, cloth, and the like with air permeability lower than that of the base material to auxiliary heater area 7 can also be applied to base material 1 of seat heater 10 in FIG. 2.

Second Modification

Figure 6:
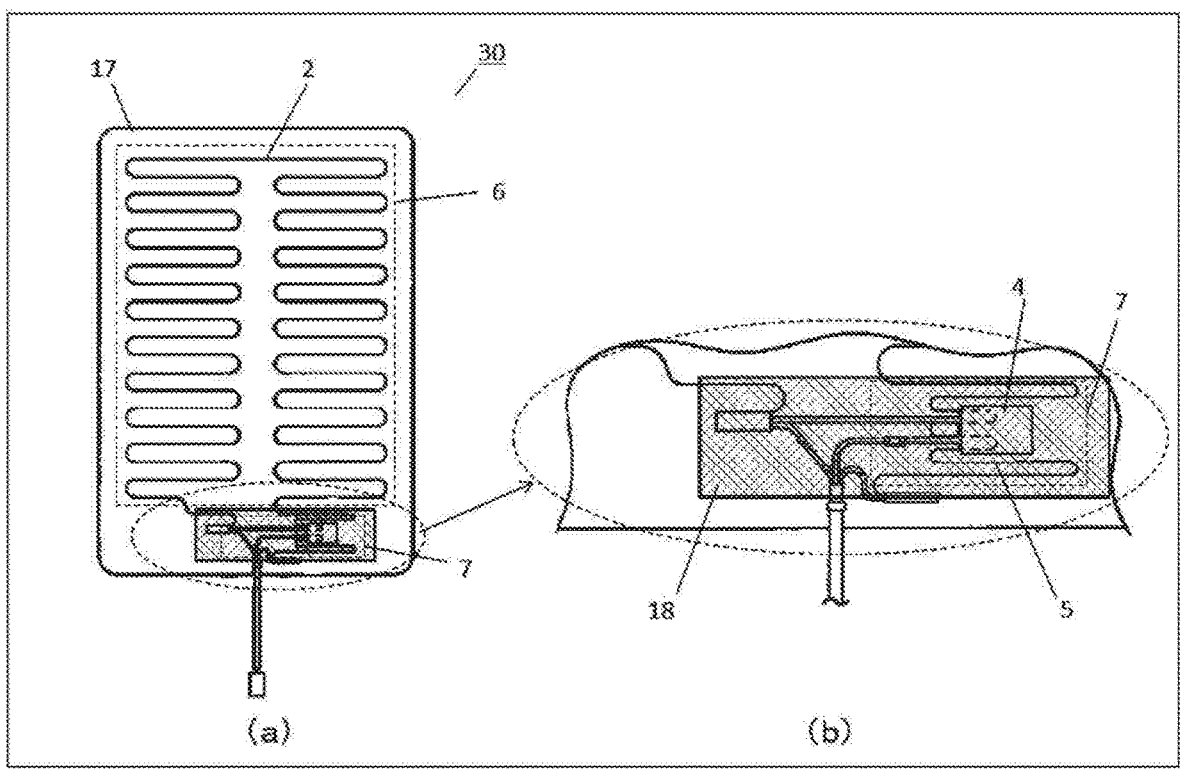
FIG. 6 is a diagram illustrating a configuration of a seat heater according to a second modification of the exemplary embodiment of the present disclosure.

FIG. 6 is a diagram illustrating a configuration of seat heater 30 according to a second modification of the exemplary embodiment. Heating wire 2 is fixed to base material 17 with air permeability by sewing or the like. Base material 17 may be base material 1 with the through holes as illustrated in FIG. 2, or may be base material 13 or 14 having the mesh structure illustrated in FIG. 4 or 5. Furthermore, nonwoven fabric, cloth, or the like with low air permeability may be provided to auxiliary heater area 7 of a base material with high air permeability.

Part (b) of FIG. 6 is an enlarged view of an oval area defined by a dotted line in part (a) of FIG. 6. Covering material 18 made by nonwoven fabric, cloth, or the like with low air permeability is provided to cover auxiliary heater area 7 provided with thermostat 4 and auxiliary heating wire 5 for heating thermostat 4. In this manner, the cooling suppression part for thermostat 4 is formed. Specifically, the cooling suppression part is a portion of auxiliary heater area 7 provided with covering material 18. In FIG. 6, covering material 18 is illustrated as a see-through member so that positions of thermostat 4 and auxiliary heating wire 5 can be recognized. With covering material 18 covering auxiliary heater area 7, thermostat 4 can be efficiently heated even when auxiliary heater area 7 is relatively small. Thus, even when the seat heater has a higher output, thermostat 4 can have a temperature rise following the temperature rise of heater area 6.

As described above, in the seat heater according to the present disclosure, auxiliary heater area 7 includes the cooling suppression part for thermostat 4, so that the heat dissipation in auxiliary heater area 7 is suppressed to enable the temperature of thermostat 4, serving as an excessive temperature rise prevention element, to rise efficiently to follow the temperature rise of heater area 6. This configuration facilitates passage of air from the inside of the seat to the seated person, while enabling the seat heater to have a higher output, and thus is capable of swiftly warming the seated person seated on the seat in cold season to offer a higher level of comfortability.

Auxiliary heater area 7 provided with thermostat 4 and auxiliary heating wire 5 is disposed at a position of seat 100 that is not easily accessible by the seated person. For example, in FIG. 1, auxiliary heater area 7 is disposed in seat part 40 at a position close to backrest 50. Thus, the temperature detected by thermostat 4 can be prevented from affecting the seated person, and the seated person can be prevented from feeling uncomfortable.

Ejection holes 90 of seat 100 are not provided close to auxiliary heater area 7. Thus, the heat dissipation from auxiliary heater area 7 can be more effectively prevented. Auxiliary heater area 7 is disposed at a position that is not easily accessible by the seated person, which means that absence of ejection holes 90 at such a position has no negative impact on the comfortability of the seated person.

Although the present disclosure has been sufficiently described in connection with preferred embodiments with reference to the accompanying drawings, it is apparent for those skilled in the art that various changes and modifications can be made based on the embodiments. Such changes and modifications are, insofar as they do not deviate from the scope of the present invention according to the appended claims, understood as included therein.

INDUSTRIAL APPLICABILITY

A seat heater according to the present disclosure provides an effect of achieving a higher level of comfortability while ensuring air permeability, and can be suitably used for a wide variety of seat heaters installed in seats for vehicles and the like.

REFERENCE MARKS IN THE DRAWINGS

1, 13, 14, 17: base material
2: heating wire
3: through hole
4: thermostat (excessive temperature rise prevention element)
5: auxiliary heating wire
6: heater area
7: auxiliary heater area
8, 9: lead wire
10, 20, 30: seat heater
11: upper thread
12: lower thread
15: thread
16*a*: small opening
16*b*: large opening
18: covering material
40: seat part
45: blower
50: backrest
60: air duct
65: Peltier device
70: pad
80: cover
90: ejection hole
100: seat

The invention claimed is:
1. A seat heater mounted to a seat, the seat heater comprising:
a heating wire;
a base material;
an excessive temperature rise prevention element; and
an auxiliary heating wire,
wherein the base material is provided with the heating wire and has air permeability, the excessive temperature rise prevention element prevents an excessive temperature rise of the heating wire, and the auxiliary heating wire heats the excessive temperature rise prevention element,
wherein the base material includes a heater area and an auxiliary heater area, and
wherein the heating wire is disposed in the heater area, and the excessive temperature rise prevention element and the auxiliary heating wire are disposed in the auxiliary heater area, and
wherein the base material in the heater area includes an air vent hole and the base material in the auxiliary heater area includes no air hole.

2. The seat heater according to claim 1, wherein the base material in the auxiliary heater area is provided with a sheet having air permeability lower than the air permeability of the base material in the heat area.

3. The seat heater according to claim 1, wherein the excessive temperature rise prevention element and the auxiliary heater area with a covering material having air permeability lower than the air permeability of the base material in the heat area.

4. A seat heater mounted to a seat, the seat heater comprising:
a heating wire;
a base material;
an excessive temperature rise prevention element; and
an auxiliary heating wire,
wherein the base material is provided with the heating wire and has air permeability, the excessive temperature rise prevention element prevents an excessive temperature rise of the heating wire, and the auxiliary heating wire heats the excessive temperature rise prevention element,
wherein the base material includes a heater area and an auxiliary heater area,
wherein the heating wire is disposed in the heater area, and the excessive temperature rise prevention element and the auxiliary heating wire are disposed in the auxiliary heater area, and
wherein the base material to have a mesh structure with the auxiliary heater area having meshes smaller than meshes in the heater area.

5. The seat heater according to claim 4, wherein the base material in the auxiliary heater area is provided with a sheet having air permeability lower than the air permeability of the base material in the heat area.

6. The seat heater according to claim 4, wherein the excessive temperature rise prevention element and the auxiliary heater area are covered with a covering material having air permeability lower than the air permeability of the base material in the heat area.

* * * * *